Feb. 14, 1950  L. W. COURT  2,497,297
APPARATUS FOR FORMING POTATO DIGGER LINKS
Filed June 5, 1948  4 Sheets-Sheet 1
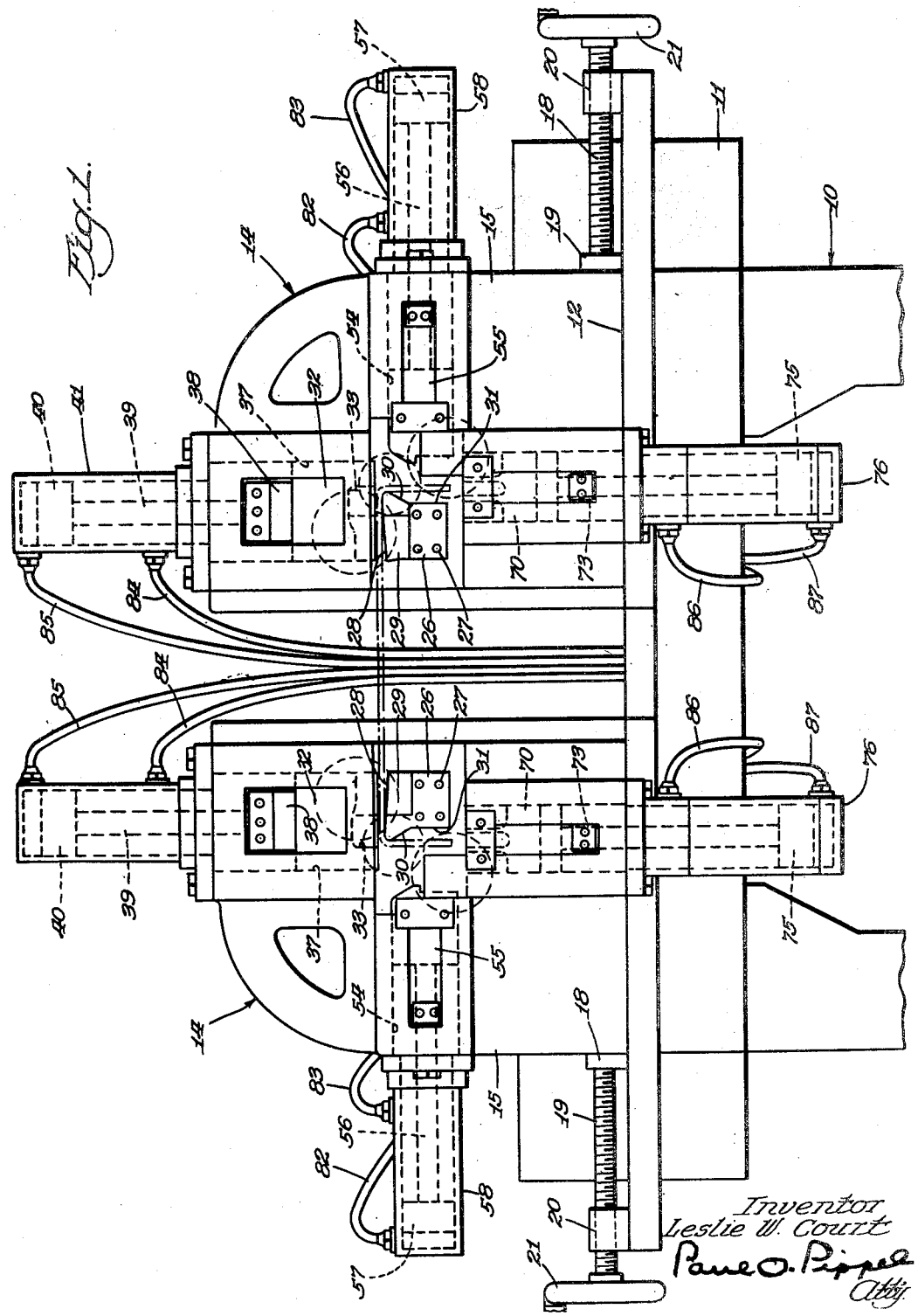
Inventor
Leslie W. Court

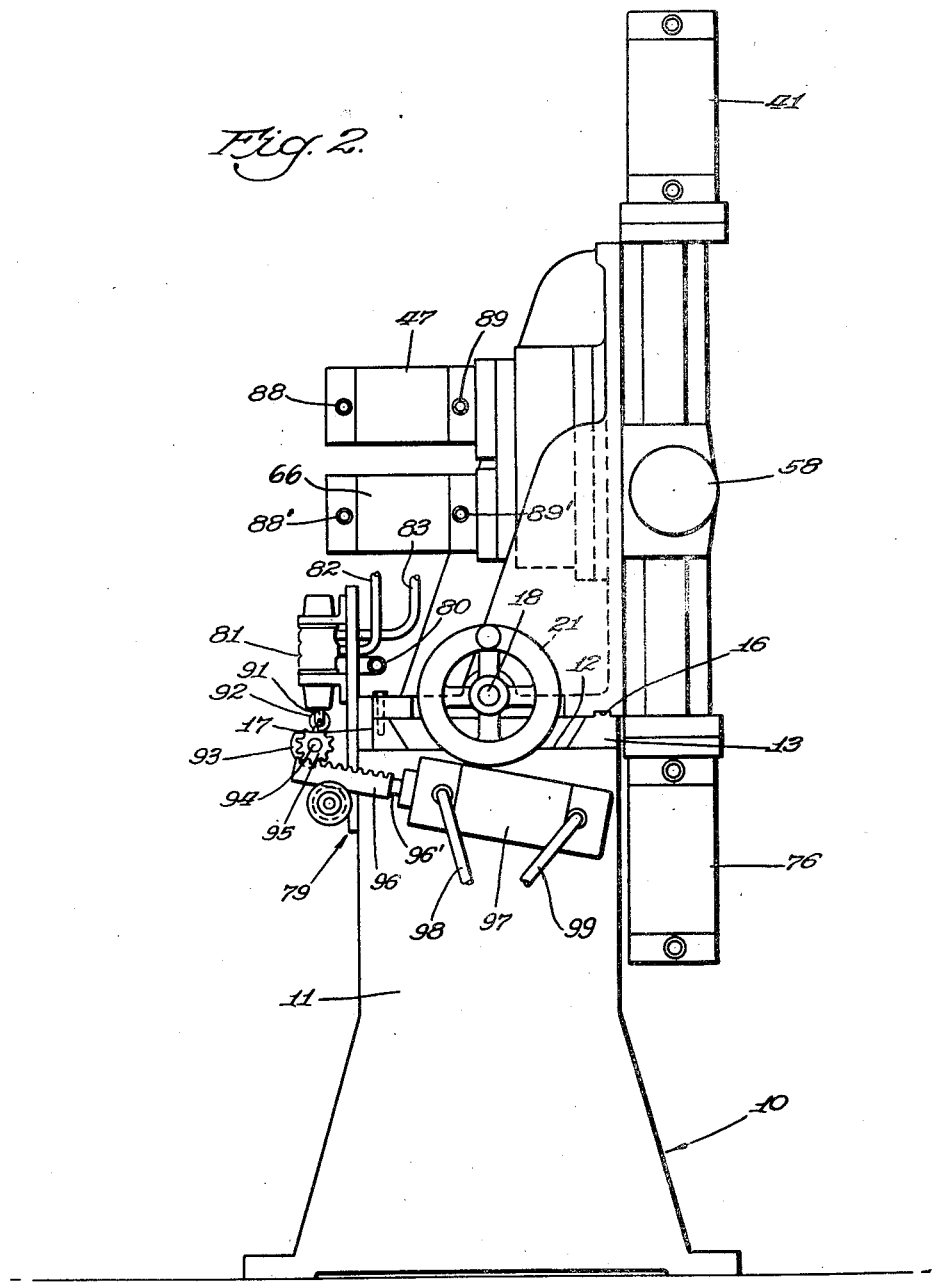

Feb. 14, 1950     L. W. COURT     2,497,297
APPARATUS FOR FORMING POTATO DIGGER LINKS
Filed June 5, 1948     4 Sheets-Sheet 3
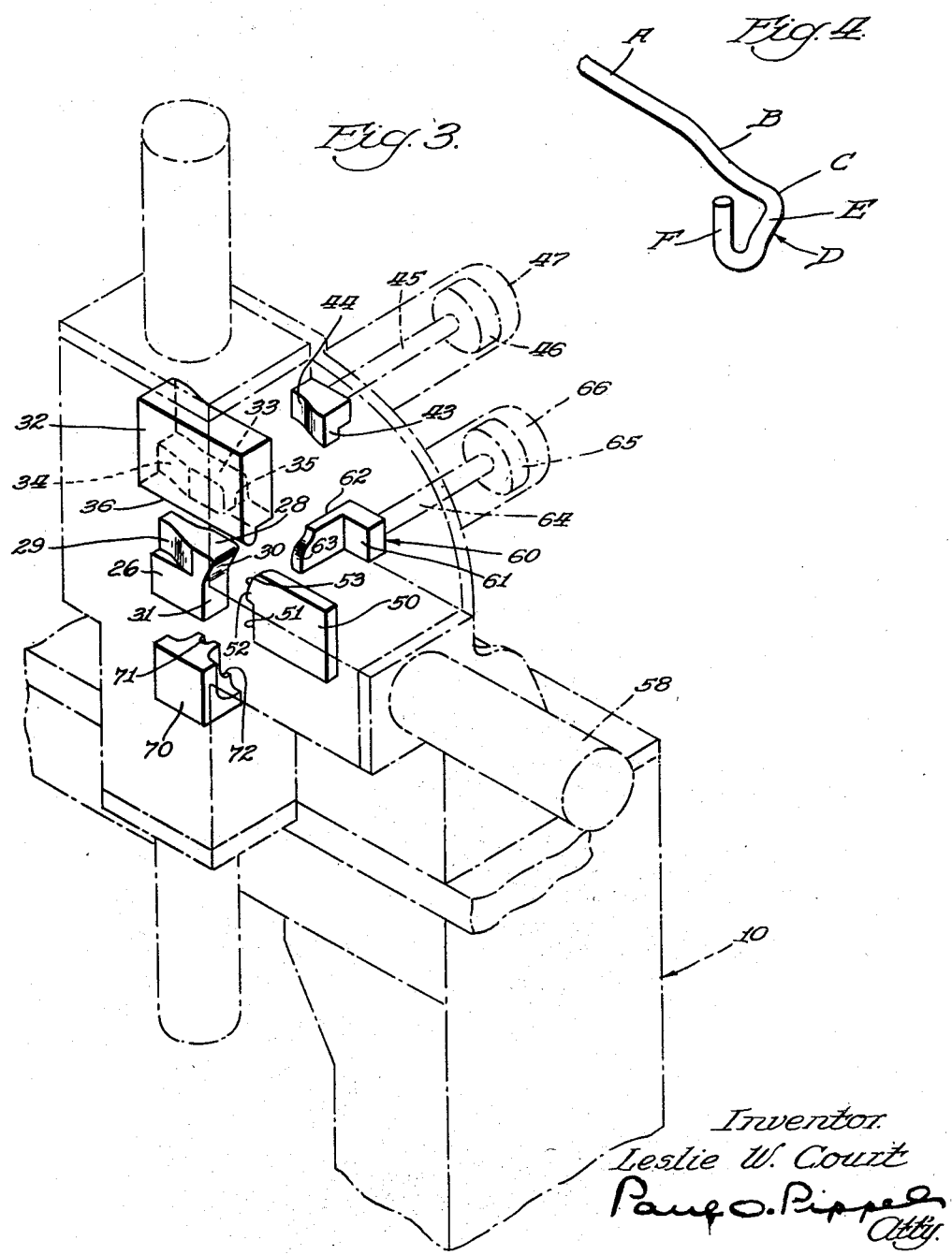
Inventor
Leslie W. Court Feb. 14, 1950  L. W. COURT  2,497,297
APPARATUS FOR FORMING POTATO DIGGER LINKS
Filed June 5, 1948  4 Sheets-Sheet 4
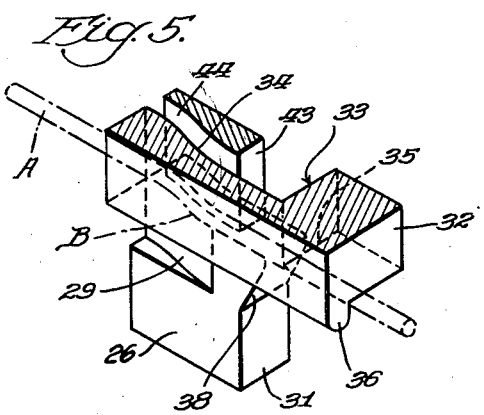
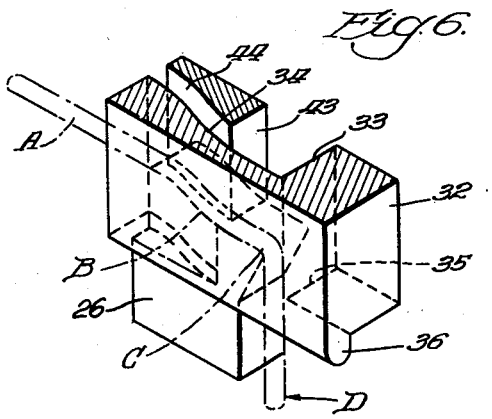
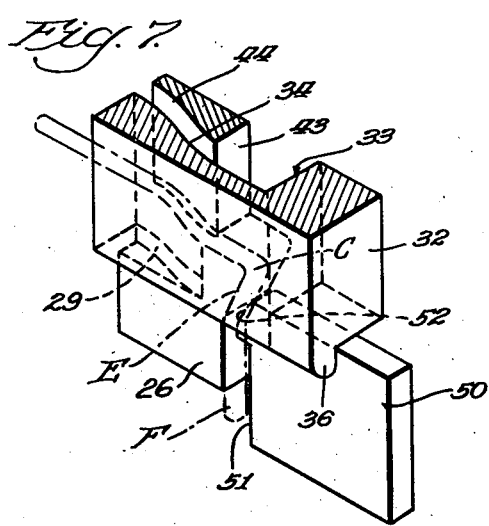
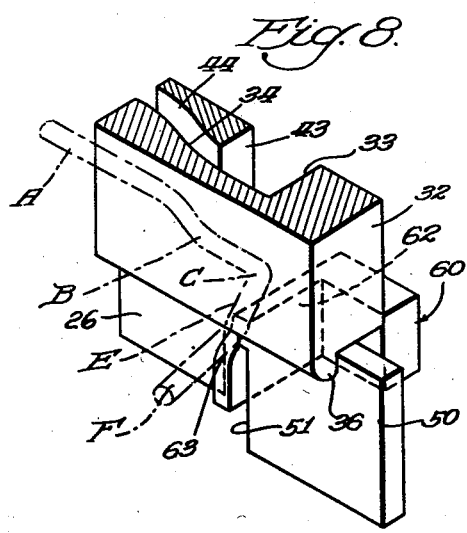
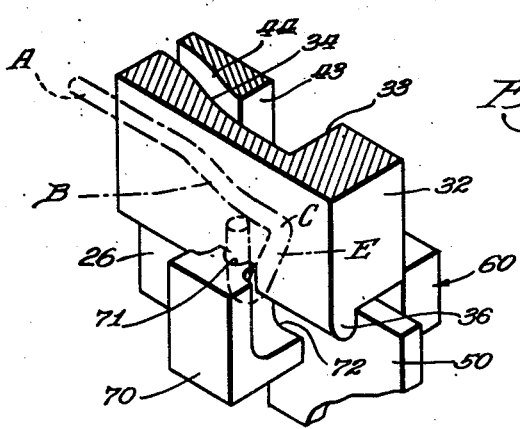
Inventor.
Leslie W. Court Patented Feb. 14, 1950

2,497,297

UNITED STATES PATENT OFFICE 2,497,297

APPARATUS FOR FORMING POTATO DIGGER LINKS

Leslie W. Court, Richmond, Ind., assignor to International Harvester Company, a corporation of New Jersey Application June 5, 1948, Serial No. 31,298

8 Claims. (Cl. 153—3)

This invention relates to an improved apparatus for forming conveyor chain links, and more particularly, to an apparatus for forming links of a type used in the endless conveyor of a potato digging machine. More specifically, this invention relates to a means and method for forming hook portions at opposite ends of a cylindrical rod.

The type of link with which the present invention is concerned is one that is well-known to those familiar with potato digging machinery. In a potato digger, such as is shown in the patent to Louis E. Smith 2,361,131 issued October 24, 1944, a plurality of horizontally spaced links are interconnected to form an endless conveyor chain upon which the potatoes are transported. Each link is provided with a pair of hooks, one at each end, and these hooks form the connecting means whereby the links are connected together. In view of the extensive use of these diggers it is necessary to replace worn and broken links quite frequently. Applicant therefore has found it desirable to provide an improved apparatus for manufacturing links in an inexpensive, efficient, and speedy manner. It is applicant's prime object, therefore, to provide an improved apparatus for forming links for endless type conveyor chains.

A further object is to provide an improved apparatus for forming potato digger links in a manner designed to eliminate undesirable internal stresses in the metal which is formed.

Still another object is to provide an improved apparatus for forming hook portions in the end of a rod.

A still further object is to provide an apparatus for forming links for endless conveyor chains, said apparatus including a plurality of hydraulically actuated die members cooperating with one another to hold ends of the rod and form said ends to a predetermined shape.

Still another object is to provide a series of co-acting die members, said die members being arranged to hold a metal rod and movable into successive mating relating with one another, thereby forming joggles and hook portions on the ends of said rod.

A still further object is to provide a stationary anvil die for supporting a rod, and a plurality of movable dies having forming surfaces arranged to successively mate with one another and the anvil die, thereby performing predetermined shaping operations on the ends of the rod in an efficient, effective, and inexpensive manner.

These and other objects will become more readily apparent upon a reading of the description when examined in connection with the accompanying drawings.

In the drawings:

Fig. 1 is a front view in elevation of a potato digger link forming machine.

Fig. 2 is a left end view of the machine.

Figure 3 is a schematic isometric view of a working head of a potato digger link forming machine.

Figure 4 is an isometric view of an end portion of a potato digger link.

Fig. 5 is an isometric view of the first step in the operation for forming the ends of a potato digger conveyor link.

Fig. 6 is an isometric view showing the second step in the operation of forming the link.

Fig 7 is an isometric view showing the third step in the formation of the link.

Fig. 8 is an isometric view showing the fourth step in the operation.

Fig. 9 is an isometric view showing the final step in the operation of the formation of the link.

The base structure

Referring particularly to Figs. 1 and 2, an apparatus for forming potato digger conveyor links is generally designated by the reference character 10. The apparatus 10 essentially consists of a supporting table or base 11 which has an upper flat table surface 12. At the rear of the flat table surface 12 there is provided a longitudinally extending guideway 13.

The apparatus 10 consists of a pair of working heads 14 which are supported on the table surface 12. The heads 14 are identical in construction and function and the same reference characters will therefore apply for both. Each working head consists of a die supporting structure 15 which has as best shown in Fig. 2 at its lower surface a longitudinally extending recess 16 which is adapted to slidably engage the guideway 13. A slide beam 17 is connected to the forward lower end of the die supporting structure 15 for the purpose of slidably mounting said die supporting structure on the table surface 12. Each working head 14 is provided with a threaded slide screw 18. The slide screw 18 is pivotally connected within a retaining member 19 connected to one end of the working head 14. The slide screw in turn extends through a threaded block 20 which is rigidly secured to the table surface 12. A manual drive wheel 21 is provided at the end of each slide screw. By manipulating the wheel 21 the slide screw is turned within the block 20 and thereupon longitudinally moves the working heads in horizontally spaced relation on the table surface 12.

The die arrangement

The arrangement of the dies is best shown in Figs. 1 and 3. A stationary anvil die 26 is rigidly secured to each working head 14 by a plurality of bolts 27. The anvil die includes a flat upper sloping surface 28 upon which a rod is thereby supported as will be presently described. The anvil die 26 also includes a vertical undercut side surface 29 which is generally shaped in the form of a reverse or S curve. One end of the anvil die 26 is provided with an inwardly sloping annular surface 30. The surface 30 slopes inwardly to a point where it joins a flat vertical surface 31.

An upper downwardly moving backing die is generally designated by the reference character 32. The backing die 32 includes a rectangular recess 33 in its lower surface. The recess 33 is provided with a vertical undercut or joggle forming surface 34 which is in the shape of a reverse or S curve. This surface 34 is adapted to mate with the surface 29 of the anvil die 26 as will become apparent later. The rectangular recess 33, forms with the lower surface of the backing die 32, a bending edge which is indicated by the reference character 35. The lower surface of the backing die also includes a longitudinally extending shoulder or rounded edge portion 36.

The backing die 32 is adapted to reciprocate vertically as best shown in Fig. 1 in a guideway 37. The die 32 is connected to an extension 38 which in turn is connected to a piston rod 39. The piston rod 39 is connected to a piston 40 which in turn reciprocates within a cylinder 41.

A joggle forming or first horizontally moving die is designated by the reference character 43. The joggle forming die 43 includes a joggle forming surface 44 generally in the shape of a reverse curve, said surface 44 being arranged to mate with the surface 34 of the backing die 32. The die 43 is adapted to be horizontally moved into engagement with the backing die 32 by means of a piston rod 45 which in turn is connected to a piston 46. The piston 46 reciprocates within a cylinder 47.

A second horizontally moving die is designated by the reference character 50. The die 50 includes an undercut surface 51. A projection 52 extends outwardly with respect to the undercut surface 51, said projection being provided with a sloping surface 53. The sloping surface 53 is shaped so that it will mate with the inwardly sloping surface 30 of the anvil die 26.

The die 50 is adapted to slide in a horizontal guideway 54 and is connected to an extension 55. The extension 55 in turn is connected to a piston rod 56. The piston rod 56 is reciprocated by means of a piston 57 which is movable within a cylinder 58.

A third horizontally moving die is designated by the reference character 60. This die 60 includes a base 61 which has connected at a right angle thereto, a forming part 62. The forming part 62 is in the form of a vertical blade which has provided at its front end a forming surface 63. As shown in Fig. 3, the forming surface 63 is also in the shape of a reverse curve. The base 61 is connected to a piston rod 64 which in turn is connected to a piston 65 reciprocable within a cylinder 66.

An upwardly moving lower die is designated by the reference character 70. The die 70 includes a vertically extending groove or recess 71 which is adapted to conform to the outer surface of a rod, to be worked upon. The lower portion of the recess 71 is formed in the shape of a hook as best shown at 72.

The lower die 70 is connected to an extension 73 which in turn is connected to the piston rod 74. The piston rod 74 is reciprocable by means of a piston 75 slidable within a cylinder 76.

The control mechanism

The control mechanism for actuating the cylinders, thus in turn reciprocating the die, may be of any type resulting in a predetermined timed sequence of operation. For the purpose of this disclosure the control mechanism is shown to include sequence valves which may be timed for the purpose of successively moving the dies into position. Only a limited showing of the control mechanism has been made since it is understood that any conventional type of control may be provided.

As best shown in Fig. 2, a control mechanism is generally indicated by the reference character 79. The control mechanism includes a conduit 80 which may extend the length of the machine 10. The conduit 80 is in turn connected to, and in communication with a sequence valve 81. Only one of the sequence valves 81 is shown, but it is to be understood that one sequence valve may be provided for each cylinder. For the purpose of illustration the sequence valve 81 has connected thereto conduits 82 and 83 which in turn are in communication with the cylinder 58. Conduits 84 and 85 are shown to be in communication with the cylinder 41. Conduits 86 and 87 are shown to be in communication with the cylinder 76. Conduits 88 and 89 are shown to be in communication with the cylinder 47. Conduits 88' and 89', as best shown in Fig. 2, are in communication with cylinder 66. It is to be understood that each pair of conduits above mentioned are connected in turn to an individual sequence valve, only one of these valves being shown.

Each sequence valve is provided with a plunger 91 having connected thereto a cam wheel 92. The cam wheel 92 is in operative engagement with a cam 93 which is rigidly secured to a shaft 94. Only one of the cams 93 is shown, but it is to be understood that a cam is provided to actuate each sequence valve. A pinion 95 is connected to the end of the shaft 94 and this pinion is in driving engagement with a rack 96. The rack 96 is connected to a piston rod 96' which in turn is reciprocable within a two-way cylinder 97. The cylinder 97 has a hydraulic fluid connection with conduits 98 and 99. Fluid from a pressure source may be supplied to the cylinder 97 by means of the conduits 98 and 99. The transmission of fluid to the cylinder is generally regulated by a valve (not shown) which is in turn controlled by an electrical timing arrangement (not shown).

During the operation of the control mechanism the rack 96 is moved, thereby rotating the pinion 95. The pinion 95 rotates the shaft 94, thus in turn rotating one of the cams 93 into engagement with one of the cam wheels 92. The reciprocation of one of the plungers 91 thereupon functions to regulate one of the sequence valves 81. Upon the operation of a sequence valve controlling one cylinder, fluid is applied to said cylinder and thereby the piston therein moves one of the dies into position. The valves are so controlled that the dies are moved and locked in position in predetermined relation. As has previously been mentioned, only one cam and one sequence valve is shown. It is to be understood, however, that a cam and valve arrangement of this type is provided for each cylinder, the only difference being that the cams are positioned circumferentially at different points on the shaft 94 so that the valves 81 are actuated in a predetermined sequence of operation. In the position of the rack 96 as shown in Fig. 2, all the valves 81 are in a non-operating position and thus the dies are also in the non-operating position shown best in Fig. 3.

It is believed that the foregoing description of the operation indicating that the dies may be reciprocated in timed relation, is sufficient for the purposes of this disclosure. As previously mentioned, any control mechanism may be provided in order to secure timed sequence of reciprocation of the dies.

The link forming operation

The description of the operation will be confined to one of the heads 14 of the machine, since the operation of both heads is similar and simultaneous. An operator places an unfinished link in the form of a rod A across the upper surface of the stationary anvil die 26. The operator thereupon presses an electric switch (not shown) which in turn causes actuation of the sequence valves and cylinders as previously described. The upper die 32 is thereupon set in motion and reciprocates downwardly upon movement of the piston 40. The die 32 initially moves downwardly to the position shown in Fig. 5. In this position the die 32 is in partial mating engagement with the anvil die 26. The lower undercut surface 34 of the die 32 is in sliding engagement with the vertical undercut surface 29 of the anvil die 26.

The joggle forming or undercut surface 34 of the die 32 now is immediately adjacent the rod A and is positioned to form a joggle in said rod. A joggle forming die 43 now is placed into operation and moves into engagement with the rod A by means of the cylinder 47. The joggle forming surface 44 presses the rod A against the joggle forming surface 34 of the upper die 32, thereby effecting a joggle B in the rod A. It should be noted that the joggle B is formed a considerable distance from one end of the rod, thereby leaving an unfinished end portion that will presently be described. It is now apparent that the upper die 32 functions as a backing unit for cooperating with the joggle forming die 43 to form a joggle B in the rod A.

After the joggle B has been formed in the rod A the die 32 again advances downwardly into the position shown in Fig. 6 with surface 34 sliding on side surface 29 of anvil die 26. In this position the die 32 is in complete engagement with the anvil die 26. As the die 32 moves downwardly a bending edge 35 of said die bends the rod A around the edge of the anvil die 26, thereby forming a bend C and leaving an end portion D bent downwardly at substantially a right angle with respect to the remainder of the rod. The rod A now is provided with a joggle B and an end portion D bent downwardly at substantially a right angle.

The next step in the operation of forming the rod A is shown in Fig. 7. At this point a second horizontally moving die 50 is placed into reciprocating movement and moves toward the end portion D of the rod A. The die 50 is placed into movement by means of the piston 65. The annular sloping surface 53 engages an upper first end portion E of the end D and presses the same inwardly against the inwardly sloping annular surface 30 of the anvil die 26. By this action the upper first end portion E is pressed inwardly underneath the joggle B at substantially an acute angle with respect thereto. This forming operation leaves a substantially vertical portion F of the rod A which still remains at substantially a right angle with respect to the remaining portion of the rod A.

The rod A is now ready to have the hook portion formed at the end thereof. A partial forming operation for this purpose is shown in Fig. 8. A third horizontally moving die 60 is placed into operation by means of a piston 65 within the cylinder 66. The reverse curve surface 63 of the die 60 engages the vertical portion F and bends the same angularly around the longitudinally extended shoulder or rounded edge portion 36 of the upper backing die 32. The hook portion is therefore partially formed.

As best shown in Fig. 9, the upwardly moving die 70 is now actuated by means of the piston 75 within the cylinder 76. As the die 70 moves upwardly the grooved recess 71 of said die is engaged by the outer surface of the portion F. As the die 70 moves upwardly the portion F is bent upwardly around the edge portion 36, thereby forming a substantially U-shaped hook on the end of the rod A. The rod A has now been completely formed into a potato digger link. It is important to note that all of the dies have respectively and successively moved into position, portions of said dies acting as backing members for the other dies, and other portions thereof acting as bending and forming surfaces.

After the rod A has thus been completely formed all of the dies retract simultaneously to their initial non-working position as shown in Fig. 3. This, of course, is accomplished by the control mechanism which was previously partially described. After the dies have thus been retracted the link A is still lying across the upper surface of the anvil die 26. In order to eject the link from its position on the surface it is only necessary to again move the second horizontal die 50 inwardly into engagement with the link A, whereby the link A may be cammed sideways and thereby pushed off of the anvil die 26. It is clear, therefore, that in this manner the links A may be repeatedly ejected.

The ends of the rod now have been formed into a conveyor link as shown in Fig. 4. Applicant has provided an apparatus having unique features which may be utilized in the formation of the conveyor links. The position of the dies has been described in terms of "upper," "lower," "horizontal," and "vertical." It must be understood that these terms are merely used for the purpose of description and are not intended as words of limitation. It should also be understood that changes and modifications may be made which do not depart from the spirit of the invention as described nor the scope thereof as defined in the appended claims.

What is claimed is:

1. An apparatus for shaping the ends of a rod comprising in combination; an anvil die arranged to support the rod; a backing die having a joggle forming surface, means for moving said backing die into mating engagement with the anvil die; a first die having a surface normally mating with said joggle forming surface, means for moving said first die into engagement with said rod and said joggle forming surface whereby a joggle is formed in said rod; means on said backing die for bending the end of said rod downwardly on the anvil die substantially at a right angle with respect to the rod, and means constructed and arranged to engage the end of said rod and bend the same into a hook.

2. An apparatus for shaping the ends of a rod comprising in combination; an anvil die arranged to support the rod; a backing die having a joggle forming surface, hydraulically actuated means for moving said backing die into mating engagement with the anvil die; a first die having a surface normally mating with said joggle forming surface, hydraulically actuated means for moving said first die into engagement with said rod and said joggle forming surface whereby a joggle is formed in said rod; means on said backing die for bending the end of said rod downwardly on a portion of the anvil die substantially at a right angle with respect to the rod, and hydraulically actuated means constructed and arranged to engage the end of said rod and bend the same into a hook.

3. An apparatus for shaping the ends of a rod comprising in combination; a stationary anvil die having a substantially flat upper surface, a vertical undercut side surface on said stationary anvil die formed generally in the shape of a reverse curve, one end of said stationary die having an angular inwardly sloping surface and a vertical surface; an upper die member, said upper die member having a vertical undercut surface formed in the shape of a reverse curve and adapted to engage said anvil die in sliding relation, a curved edge portion on the lower surface of said upper die, means for moving said upper die into partial engagement with the anvil die; a first horizontally moving die, said die having a side surface in the shape of a reverse curve, means for moving said die horizontally into engagement with a rod supported on the anvil die, the side surface of said first die pressing the rod against the vertical undercut surface of the upper die whereby a joggle is formed in the rod a spaced distance from its end, means for vertically moving said upper die downwardly into complete mating engagement with the anvil die whereby a portion of said upper die engages the end portion of said rod thereby bending the same downwardly substantially at a right angle with respect to the remainder of said rod; a second horizontally moving die including a projection having a surface sloping angularly in the same general direction as the inwardly sloping surface of the anvil die, means for moving said second die horizontally into engagement with the end portion of the rod immediately adjacent the bend thereby pressing an upper section of the end portion angularly inwardly against the sloping surface whereby the upper section of the end portion is angularly bent inwardly underneath the joggle; a third horizontally moving die having a curved forming surface, means for moving said third die horizontally into engagement with the lower portion of the end thereby bending said lower portion partially around the curved edge of the upper die; and an upwardly moving lower die, said lower die having a groove generally corresponding to the outer surface of the rod, means for moving said lower die upwardly whereby the lower portion of the end is held in said groove and bent upwardly about the curved edge of the upper die thereby forming a hook portion on the end of said rod.

4. An apparatus for shaping the ends of a rod comprising in combination; a stationary anvil die having a vertical undercut side surface formed generally in the shape of a reverse curve, one end of said stationary die having an angular inwardly sloping surface and a vertical surface; an upper die member, said upper die member having a vertical undercut surface formed in the shape of a reverse curve and adapted to engage said anvil die in mating relation, a curved shoulder portion on the lower surface of said upper die, means for moving said upper die into partial mating relation with the anvil die; a first horizontally moving die, said die having a side surface in the shape of a reverse curve, means for moving said die horizontally into engagement with a rod supported on the anvil die, the side surface of said first die normally mating with the undercut surface and pressing the rod against said surface of the upper die whereby a joggle is formed in the rod a spaced distance from its end, means for vertically moving said upper die downwardly into complete mating engagement with the anvil die whereby a portion of said upper die engages the end portion of said rod thereby bending the same downwardly substantially at a right angle with respect to the remainder of said rod; a second horizontally moving die including a projection having a surface sloping angularly in the same general direction as the inwardly sloping surface of the anvil die, means for moving said second die horizontally into engagement with the end portion of the rod immediately adjacent the bend thereby pressing an upper section of the end portion angularly inwardly against the sloping surface whereby the upper section of the end portion is angularly bent inwardly underneath the joggle; a third horizontally moving die having a curved forming surface, means for moving said third die horizontally into engagement with the lower portion of the end thereby bending said lower portion partially around the curved shoulder portion of the upper die; and an upwardly moving lower die, said lower die having a groove generally corresponding to the outer surface of the rod, means for moving said lower die upwardly whereby the lower portion of the end is held in said groove and bent upwardly about the curved shoulder portion of the upper die thereby forming a hook portion on the end of said rod.

5. An apparatus for shaping the ends of a rod comprising in combination; a stationary anvil die member having a vertical undercut side formed generally in the shape of a reverse curve, one end of said stationary die having an angular inwardly sloping surface; an upper die member, said upper die member having a vertical undercut surface formed in the shape of a reverse curve and adapted to engage the undercut side surface of said anvil die in mating relation, a curved projecting shoulder portion on the lower surface of said upper die, means for moving said upper die into partial engagement with the anvil die; a first horizontally moving die, said die having a side surface in the shape of a reverse curve, means for moving said die horizontally into engagement with a rod supported on the anvil die, the side surface of said first die pressing the rod against the vertical undercut surface of the upper die whereby a joggle is formed in the rod a spaced distance from its end, means for vertically moving said upper die downwardly into complete mating engagement with the anvil die whereby a portion of said upper die engages the end portion of said rod thereby bending the same downwardly substantially at a right angle with respect to the remainder of said rod; a second horizontally moving die including a projection having a surface sloping angularly in the same general direction as the inwardly sloping surface of the anvil die, means for moving said second die horizontally into engagement with the end portion of the rod immediately adjacent the bend thereby pressing an upper section of the end portion angularly inwardly against the sloping surface whereby the upper section of the end portion is angularly bent inwardly underneath the joggle; a third horizontally moving die having a curved forming surface, means for moving said third die horizontally into engagement with the lower portion of the end thereby bending said lower portion partially around the shoulder portion of the upper die; and an upwardly moving lower die, said lower die having a groove generally corresponding to the outer surface of the rod, and means for moving said lower die upwardly whereby the lower portion of the end is held in said groove and bent upwardly about the projecting shoulder portion of the upper die thereby forming a hook portion on the end of said rod.

6. An apparatus for shaping the ends of a rod comprising in combination; a stationary anvil die member having a surface formed generally in the shape of a reverse curve, one end of said stationary die having an angular inwardly sloping surface; an upper die member, said upper die member having a vertical under-cut surface formed in the shape of a reverse curve and adapted to engage said anvil die in mating relation, a curved edge projecting from the lower surface of said upper die, means for moving said upper die into partial mating engagement with the anvil die, a first horizontally moving die, said die having a side surface in the shape of a reverse curve, means for moving said die horizontally into engagement with a rod supported on the anvil die, the side surface of said first die pressing the rod against the vertical undercut surface of the upper die whereby a joggle is formed in the rod a spaced distance from its end, means for moving said upper die downwardly into complete mating engagement with the anvil die whereby a portion of said upper die engages the end portion of said rod thereby bending the same downwardly substantially at a right angle with respect to the remainder of said rod; a second horizontally moving die including a surface sloping angularly in the same general direction as the inwardly sloping surface of the anvil die, means for moving said second die horizontally into engagement with the end portion of the rod immediately adjacent the bend thereby pressing an upper section of the end portion angularly inwardly against the sloping surface whereby said upper section of the end portion is angularly bent inwardly underneath the joggle; a third horizontally moving die having a curved forming surface, means for moving said third die horizontally into engagement with the lower portion of the end thereby bending said lower portion partially around the curved edge of the upper die; and an upwardly moving lower die, said lower die having a groove generally corresponding to the outer surface of the rod, means for moving said lower die upwardly whereby the lower portion of the end is held in said groove and bent upwardly about the curved edge of the upper die thereby forming a hook portion on the end of said rod.

7. An apparatus for shaping the ends of a rod comprising in combination; a stationary anvil die arranged to support the rod, said anvil die having an angular inwardly sloping edge; an upper die member arranged to cooperate with the anvil die, said upper die member having a joggle surface generally formed in the shape of a reverse curve, a curved edge on a surface of the upper die, means for moving the upper die downwardly with the joggle surface adjacent the rod; a first horizontal die having a surface normally mating with the joggle surface of the upper die, means for moving said first die into engagement with said rod and the joggle surface thereby forming a joggle in said rod; means for again moving the upper die downwardly whereby a portion of said die bends the end of said rod downwardly over the angular inwardly sloping edge of the anvil die; a die having a surface normally mating with the angular inwardly sloping surface of the anvil die, means for moving said die against the downwardly bent end of the rod thereby bending the same inwardly under the joggle, a die member having a surface normally corresponding to the surface of the end of the rod, and means for moving said die member whereby a portion of the end of said rod is bent around the curved edge of said upper die thereby forming a hook portion on said rod.

8. An apparatus according to claim 7 wherein each of the movable dies is successively movable into position and means for retaining said dies in position until the hook portion has been formed.

LESLIE W. COURT.

REFERENCES CITED

The following references are of record in the file of this patent:

UNITED STATES PATENTS

| Number | Name | Date |
|---|---|---|
| 159,314 | Foster | Feb. 2, 1875 |
| 517,775 | Steinmann | Apr. 3, 1894 |
| 581,851 | Dowden | May 4, 1897 |
| 832,671 | Hist | Oct. 9, 1906 |
| 865,001 | Thompson | Sept. 3, 1907 |
| 986,713 | Hoover | Mar. 4, 1911 |
| 1,011,829 | McCarthy | Dec. 12, 1911 |
| 1,308,591 | James | July 1, 1919 |
| 1,417,397 | Lewis | May 23, 1922 |
| 1,706,274 | Woodings | Mar. 19, 1929 |
| 1,765,790 | Doutt | June 24, 1930 |
| 1,925,804 | Hiering | Sept. 5, 1933 |
| 1,973,436 | Hjort | Sept. 11, 1934 |
| 2,122,082 | Bertram | June 28, 1938 |
| 2,217,333 | Dahlman | Oct. 8, 1940 |
| 2,279,490 | Pearne | Apr. 14, 1942 |
| 2,290,222 | Barbknecht | July 21, 1942 |
| 2,357,605 | Nivison | Sept. 5, 1944 |
| 2,436,642 | Greenwood | Feb. 24, 1948 |